United States Patent Office.

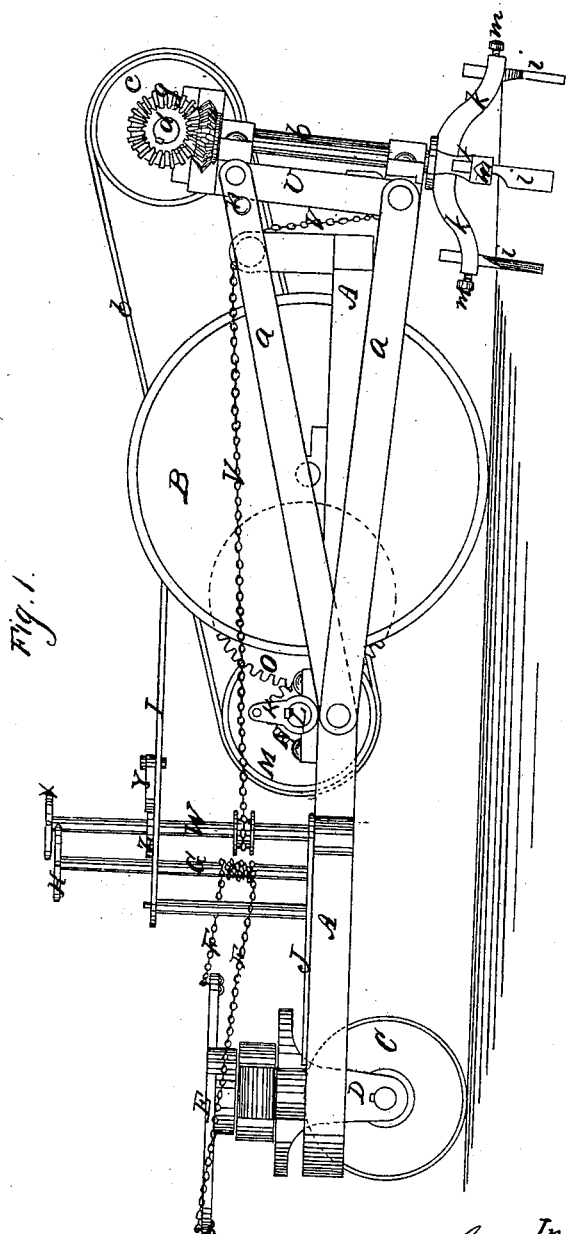

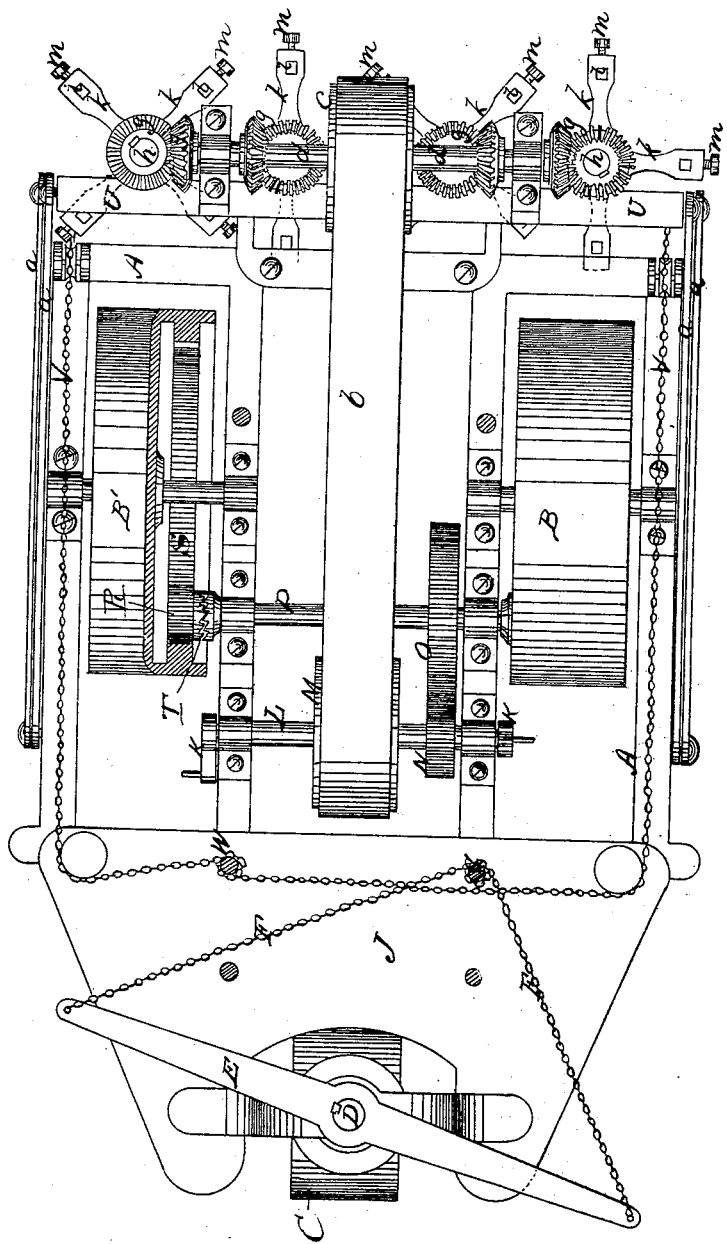

PHILANDER H. STANDISH, OF MARTINEZ, CALIFORNIA, ASSIGNOR TO HIMSELF AND OLIVER C. COFFIN.

Letters Patent No. 75,310, dated March 10, 1868.

IMPROVEMENT IN STEAM-PLOUGH AND CULTIVATOR.

The Schedule referred to in these Letters Patent and making part of the same.

TO ALL WHOM IT MAY CONCERN:

Be it known that I, PHILANDER H. STANDISH, of Martinez, county of Contra Costa, State of California, have invented an Improved Steam-Plough and Cultivator; and I do hereby declare the following description and accompanying drawings are sufficient to enable any person skilled in the art or science to which it most nearly appertains to make and use my said invention or improvements without further invention or experiment.

The object of my invention is to provide an improved locomotive steam-plough, which is so constructed that the power is transmitted directly from the engine to the ploughs or cutters, thereby greatly lessening the power needed for traction. It also consists of a novel mode of operating the ploughs, by which the earth is ploughed transversely to the travel of the machine, and is thoroughly broken up, and so completely pulverized as not to need any further cultivation.

The ploughs are attached to a movable supplementary frame, by which they can be raised so as to entirely clear the ground when necessary.

To more fully explain my invention reference is had to the accompanying drawings and letters of reference, forming part of this specification, of which—

Figure 1 is a side elevation of my machine.

Figure 2 is a plan.

Similar letters of reference in each of the drawings indicate like parts.

A is a strong frame, of wood or iron, and of suitable shape, which supports the machinery, and is mounted upon the broad wheels B B'. A guiding-wheel, C, is attached to the vertical standard D, having the long lever E firmly keyed to the top. From the extremities of this lever strong chains, F F, are passed to the upright spindle or capstan G, which is operated by the lever H, the operator standing on the platform I, and thus turning the machine in any desired direction. The platform J supports the engine, which may be a simple portable one, or of some convenient form for the work, and is connected to the cranks K K on the shaft L. This shaft carries the driving-pulley M for the ploughs and the pinion N, which operates the gear-wheel O, keyed to the shaft P. A pinion, R, turns loosely on each end of this shaft, and meshes into the gear S on the inside of the wheel B B', shown in fig. 2, and thus drives the machine, when the pinion is connected with the clutches T, one of which is made at each end of the shaft P, to facilitate the turning of the machine. The ploughs are attached to a supplementary frame, U, which may be elevated or lowered at pleasure by the chains V V, operated by the capstan W and the lever X. A pawl, Y, and ratchet, Z, retain the frame at any desired elevation. The frame U has the strong bars $a\ a$ fastened to its upper and lower extremities. These bars extend forward to a point in a line with the shaft L, where they are pivoted to the frame A. By this device the driving-belt $b$ is always kept tight in the upward and downward movements of the frame U. By means of holes $n$, in the bars $a$, the angles at which the frame U stands may be changed as desired. The belt $b$ connects the driving-pulley M with the pulley $c$ on the shaft $d$, and by means of the bevelled gears $g\ g\ g\ g$ drives the vertical shaft $h\ h$, which operate the ploughs or cutters. This consists of steel knifes, $i\ i$, of any desired form, attached to the arms $k$ by means of set-screws $m$, so as to be easily removed for sharpening or replacing if broken. The arms $k$ are so placed on their respective shafts that each arm passes between the arms of the next, so that all of the earth as wide as the extent of the knives is thoroughly broken up and pulverized. The arms $k$ are fast to the upright $h$, which are made to revolve, causing the ploughs or cutters to move in a circle, as well as to cut or plough transversely to the travel of the machine. It also causes the ploughs to pass through the ploughed earth as they return to the solid or uncut earth in finishing their rotation, thus thoroughly pulverizing and harrowing.

The upright shafts are adjustable forward and backward, so as to give the proper position to the plough with reference to the land. The cutters are also made to rotate in opposite directions, to counteract the tendency to move to one side, which would happen if they all moved in one direction.

By constructing my machine in this manner, the difficulty attendant on those ploughs in which the power is applied through the wheels is avoided, as all power for the ploughs is applied directly from the engine. In addition to this, by constructing the ploughs so as to rotate in a horizontal plane, the strain is so reduced that the power needed to drag the machine is simply enough to move the weight and overcome the grades in the land.

Having thus described my invention, what I desire to secure by Letters Patent, is—

1. A steam-plough, having the rotating knives $i$ $i$ operating in a horizontal plane and transversely to the travel of the machine, and the supporting-arms $k$ $k$, or their equivalents, together with the vertical shafts $h$, the whole constructed and operating substantially as herein described.

2. I claim the movable frame U and the arms $a$ $a$, together with the chains V and capstans W for raising and depressing the ploughs, substantially as herein described.

3. I claim operating the ploughs, when moving in a horizontal plane, directly from the engine by the belt $b$, or an equivalent device, substantially as described.

In witness whereof, I have hereunto set my hand and seal.

PHILANDER H. STANDISH. [L. S.]

Witnesses:
   C. W. M. SMITH,
   A. T. DEWEY.